March 24, 1959 — M. L. ANSON ET AL — 2,879,163
METHOD FOR PREPARING A MEAT-LIKE PRODUCT
Filed Dec. 13, 1954 — 2 Sheets-Sheet 1
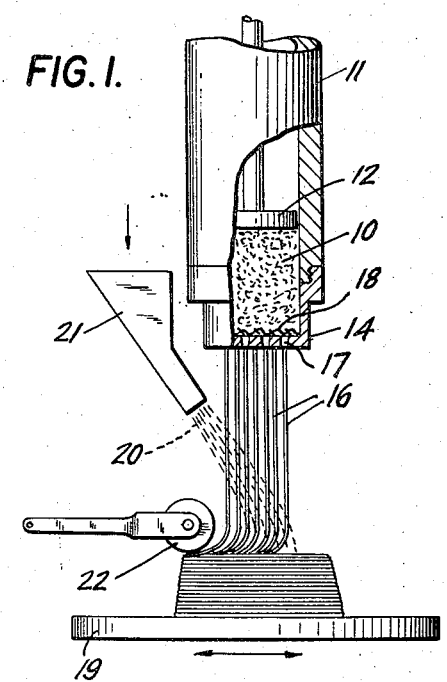
FIG. I.
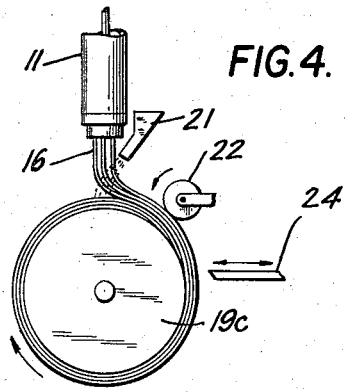
FIG. 4.
FIG. 3.
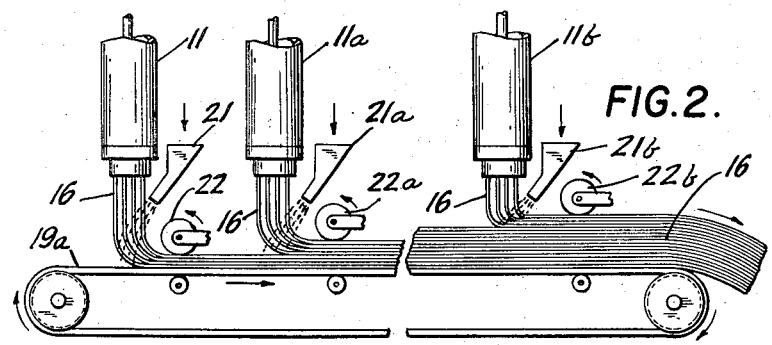
FIG. 2.
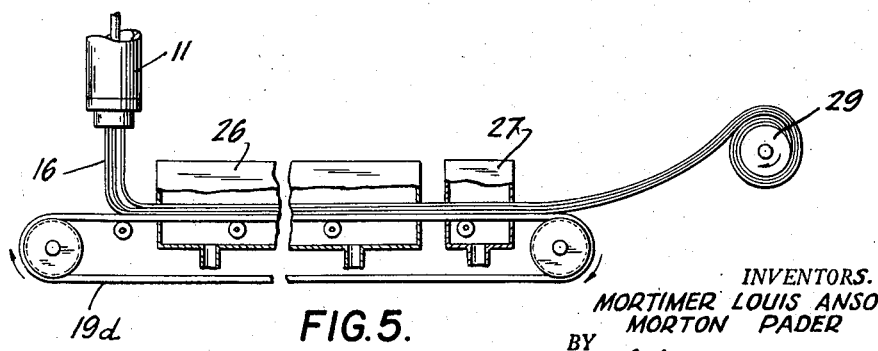
FIG. 5.
INVENTORS.
MORTIMER LOUIS ANSON,
MORTON PADER
BY
Campbell, Brumbaugh, Free, &
Graves
Their ATTORNEY

United States Patent Office

2,879,163
Patented Mar. 24, 1959

2,879,163

METHOD FOR PREPARING A MEAT-LIKE PRODUCT

Mortimer Louis Anson, New York, N.Y., and Morton Pader, West Englewood, N.J., assignors to Lever Brothers Company, New York, N.Y., a corporation of Maine Application December 13, 1954, Serial No. 474,912

4 Claims. (Cl. 99—14)

This application is a continuation-in-part of our copending application Serial No. 304,844, filed August 16, 1952, now U. S. Patent No. 2,830,902.

Our aforesaid copending application describes and claims food products which simulate to a remarkable extent the chewiness, moistness and texture of cooked meat, and a method of preparing such products from inexpensive proteins such as oil seed proteins, casein and fish proteins. In accordance with the method described, products can be made which resemble cuts or slices of meat of non-homogeneous texture such as pot roasts, and the like, as well as products which resemble hamburgers, meat patties, meat loaves, sausages, etc.

In the aforesaid copending application certain terms are defined. These terms, which include "chewy protein gel," "gel precursor," "outer additive," as well as other terms, are also used in this application and possess the same meaning as in the prior application.

The term "gel precursor," as used herein, refers to a system essentially of protein and water which is capable of forming a chewy protein gel, usually on being heated. The gel precursor is formed by adjusting an aqueous dispersion of protein to a protein concentration of from about 18% to about 50%, and preferably from about 20% to about 40%, and to a pH of from about 6 to about 8, and preferably from about 6.5 to about 7.5.

A "chewy gel" or "chewy protein gel" refers to a system essentially of protein in colloidal dimensions in water and which when pieces of substantial size are chewed in the mouth has the physical properties of resilience, elasticity and resistance to shear. These properties and others of the gel are included in the more descriptive and inclusive term "chewy." It also preferably has the characteristic of heat irreversibility, i.e., it essentially retains its firmness when subjected to heat, particularly in products which are to be subjected to heat processing or normal cooking conditions prior to consumption. The chewy gel has a hydrated structure and has, in the absence of other substances, a smooth moist taste in the mouth. The pH of the chewy gel is usually near neutrality. In appearance the chewy protein gel is smooth and uniform and, unless other materials are present which change its appearance, slices of suitable thinness are transparent or translucent. Other substances such as carbohydrate materials, non-chewy proteins, fats, flavoring materials, coloring materials, vitamins and minerals may be suspended or dissolved in the protein gel or coated on the gel particles.

The term "additive" is used to include substances which are added to the gel phase, in which case they may be considered as "inner additives," or which are in a relationship external to the gel phase, in which case they are "outer additives." Some substances may fall within both classifications, dependent upon the nature of their use. The additives may comprise components modifying the character of the chewy gel per se, or the final unhomogeneous product, such as texturating agents, binders, anti-binders and flavoring, coloring or fortifying agents. In some instances, the additive may not become fully effective until after further treatment of the unhomogeneous product.

The present application is directed particularly to improvements in apparatus for preparing products of meat-like characteristics, and to improvements in the manipulative steps involved in forming such products from a gel precursor.

The apparatus of the invention generally includes a table, platform or other surface, means movable relative to the platform for extruding the gel precursor in the form of thin cylinders onto the table or platform in substantial parallelism and in superimposed layers and means for treating the cylinders to inhibit their tendency to fuse themselves into a homogeneous mass. In one preferred embodiment of the apparatus, the treating means comprises a device for coating the extruded cylinders of gel precursor with an edible outer additive, preferably in the form of a powder. In another embodiment, the treating means comprises a device for steaming the cylinders and thereby partially setting up the gel. Preferably, the apparatus also includes a means for gently compacting the superimposed layers of cylinders.

The table or platform is preferably movable and may comprise a reciprocating table, a rotating table, an endless conveyor belt, or the peripheral surface of a cylinder. Inasmuch as the extruded cylinders of gel precursor are generally very sticky, it is preferred that the surface of the table or platform onto which the cylinders are extruded be covered with a non-adhering material such as "Teflon," a high polymer of tetrafluoroethylene.

The extrusion means preferably comprises one or more extrusion cylinders of the type generally used in the manufacture of spaghetti and similar products. In a preferred embodiment, the die through which gel precursor is extruded is provided with several rows of holes, the rows being substantially perpendicular to the direction of relative motion of the platform or table beneath the die and the holes in adjacent rows being offset slightly so that all the cylinders of gel precursor extruded from a given die are encouraged to form substantially a single layer of cylinders on the table or platform with one pass thereof under the extruder. A single extruder is sufficient if the table reciprocates or rotates, although it is within the contemplation of the invention to use two or more. If the table or platform is in the form of a continuous conveyor belt, it is preferable to utilize several extruders.

The device for coating the extruded cylinders with an edible outer additive is preferably in the form of a distributor immediately adjacent the extruding device that is capable of dusting or sprinkling the outer additive, in powder form, over the extruded cylinders before and while they are laid in substantial parallelism on the surface of the platform or table or layered upon one another. When steaming of the cylinders is contemplated, the cylinders are preferably deposited on an endless conveyor belt passing first through a suitable steaming device and then through a cooling chamber.

A roller is provided to compact gently the layers of gel precursor cylinders and outer additive substantially as they are formed, the surface of the roller being covered by a non-adhering material such as "Teflon" and being mounted in well known manner to be capable, where necessary, of adapting its height to the thickness of the product in various stages of its production.

The manipulative steps of the method to which the invention is particularly directed include the steps of extruding a plurality of cylinders of protein gel precursor, treating the extruded cylinders to inhibit their tendency to fuse themselves into a homogeneous mass, and subjecting the treated mass of cylinders to an elevated temperature to form a chewy protein product. One preferred embodiment comprises coating, if desired by dusting or sprinkling, the cylinders with an edible outer additive, layering the coated cylinders in susbtantial parallelism, compacting the layered and coated cylinders, and finally subjecting the compacted mass of cylinders and outer additive to an elevated temperature to convert the gel precursor into a chewy protein gel and thus form a chewy protein product resembling meat in appearance, taste and texture. Another embodiment comprises steaming the extruded cylinders sufficiently to partially set up the gel, cooling and layering the steamed cylinders, coating them with an edible outer additive, and autoclaving the coated cylinders.

The advantages and utility of the apparatus and method of the present invention will become further apparent from the following detailed description and example made with reference to the accompanying drawing, wherein:

Figure 1 is a schematic illustration of an embodiment of the invention utilizing a reciprocating table;

Figure 2 is a schematic illustration of an embodiment wherein the platform or table is in the form of an endless conveyor belt;

Figure 3 illustrates an embodiment wherein the surface on which the cylinders of gel precursor are deposited is a rotating table;

Figure 4 illustrates an embodiment in which said cylinders are extruded onto the peripheral surface of a rotating drum; and Figure 5 illustrates an embodiment in which the extruded cylinders are first steamed, then cooled, and thereupon layered for a coating treatment and a final autoclaving.

Figure 6:
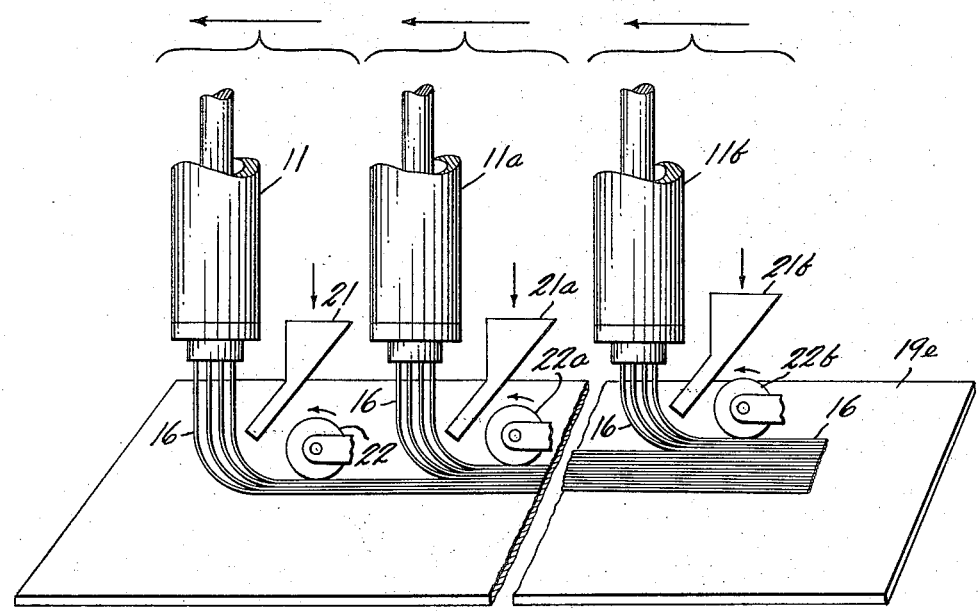
Figure 6 is a schematic illustration of an embodiment of the invention utilizing a movable extrusion means.

Referring now to Figure 1 of the drawing, the gel precursor 10, in an extrusion cylinder 11 provided with a piston 12 and a die 14, is extruded in the form of cylinders 16 through the holes 17 in the die onto the surface of a reciprocating table 19. It is preferable to insert a fine mesh screen 18 into the die immediately above the holes 17 in order to avoid clogging of the holes and consequent interruption in the formation of the cylinders of gel precursor. As the cylinders 16 move in substantial parallelism toward the surface of the table 19, they are dusted or sprinkled with an outer additive 20 from an additive distributor 21. A roller 22, preferably covered with "Teflon," is provided gently to compact the layers of gel precursor cylinders substantially as they are formed. The roller is preferably moved out of the way during the return stroke of the table, i.e., the stroke to the left as seen in Figure 1.

The apparatus illustrated in Figure 2 comprises a continuous conveyor belt 19a, a series of extrusion cylinders 11, 11a, and 11b and associated outer additive distributors 21, 21a, and 21b and compacting rollers 22, 22a, and 22b.

In Figure 3, the platform or table 19b is rotatable on a substantially vertical axis and one or more extrusion cylinders 11 and outer additive distributors 21 are provided. The roller 22a is preferably conical in shape to avoid any shearing action on the cylinders of protein gel precursor deposited on the rotating table 19b by the extrusion cylinder 11. If desired, the diameter of the holes in the die used for extrusion can be varied so as to extrude longer lengths of strands per unit time on to the outer edge of the rotating table to compensate for the larger circumference.

In the apparatus illustrated schematically in Figure 4, the platform or table is the peripheral surface of a relatively large drum 19c, the extrusion cylinder 11, outer additive distributor 21 and roller 22 being of substantially the same construction as those shown in Figure 1. A reciprocable scraper blade 24 is preferably provided to scrape the layered mass periodically off the surface of the drum 19c. If desired, the rate of extrusion or the speed of the drum can be varied to compensate for the increased diameter of the drum as the layer is built up.

In operation, the gel precursor, prepared as described in detail in copending application Serial No. 304,844, is placed in the extrusion cylinder and the linear rate of extrusion of the gel precursor cylinders is synchronized with the linear speed of the table or platform so that the gel precursor cylinders will be deposited thereon in substantial parallelism. The outer additive, which may comprise flour, or other edible additive as described in our copending application Serial No. 304,844, referred to previously, is continuously dusted, or sprinkled onto the cylinders as they pass from the die to the table. The gentle compacting of the superimposed layers of gel precursor cylinders by the roller is effective in eliminating substantial voids in the product and in producing sufficient cohesion among the various gel precursor cylinders to facilitate further processing and contributes to the generally desirable characteristics of the final product. When a mass of a suitable number of superimposed layers has been formed, it is subjected to heat treatment, preferably autoclaving in the presence of steam, to convert the gel precursor into chewy gel particles and thus impart to the finished product the chewy characteristics of meat.

In Figure 5, cylinders of gel precursor are extruded from the extrusion cylinder 11 onto an endless conveyor belt 19d and passed successively through a steam chamber 26 and a cooling chamber 27. The partially gelled cylinders are then collected on a spool 29 or similar device, whereupon they may be coated with a slurry of proteinaceous outer additive, shaped, and subjected to further heat processing, such as autoclaving.

The apparatus illustrated in Figure 6 comprises a stationary platform 19e and a series of movable extrusion cylinders 11, 11a and 11b and associated outer additive distributors 21, 21a and 21b and compacting rollers 22, 22a and 22b.

EXAMPLE

Part A

Five kilograms of peanut meal prepared by solvent-extraction of lye-dipped peanuts, were suspended in 95 liters of water at 22° C. 240 cc. of a 2.09 N aqueous sodium hydroxide solution were added to the suspension. This suspension, which had a pH of 7.2, was stirred for 60 minutes and then centrifuged to remove the insoluble fraction of the meal.

84 liters of the extract were heated to 95° C. by the introduction of live steam and maintained at that temperature for 5 minutes. While stirring the heated extract, 304 cc. of 3.58 N hydrochloric acid were added, whereupon the protein was precipitated. The suspension of protein, having a pH of 4.6, was maintained at a temperature of 95° C. for an additional 5 minutes and then centrifuged at 1800 g. to collect the protein. The protein suspension thus obtained had a solids content of 34%.

Part B 60 cc. of 2.09 N sodium hydroxide, 155 cc. of water and 12 grams of locust bean gum were added to 1000 grams of the protein suspension prepared in Part A. The materials were thoroughly mixed and then broken down to a smooth paste by passing the mixture through a roller mill. The resulting smooth plastic mass (gel precursor) was at a pH of 7.1 and had a protein content of 28%.

Part C

The gel precursor prepared in Part B was placed in the cylinder of a macaroni extruder having a die 2½" in diameter with four rows of holes, each having a diameter of 0.055" at the top and 0.007" at the bottom. The rows were spaced 3/16" apart and the holes in each row were spaced 3/32" apart, center to center. The holes in adjacent rows were staggered in such a manner that the extruded material, when deposited on a flat surface moving horizontally in a direction perpendicular to the rows of holes, was laid down as a single layer of substantially parallel cylinders. A 100 mesh stainless steel screen was inserted into the extruder immediately over the die to prevent clogging of the die by large pieces of protein which might not have been broken down in the roller mill or by foreign material.

The gel precursor was extruded onto a reciprocating table under the die, as illustrated in Figure 1 of the drawing, the table being moved at a rate just sufficient to collect the protein cylinders in substantial parallelism. As the cylinders were deposited on the table, they were dusted with a mixture of 3 parts wheat starch to one part skimmed milk powder and were gently compressed by a "Teflon"-covered roller. This procedure was continued until a mat, consisting of gently compressed layers of substantially parallel cylinders, dusted with the wheat starch-skimmed milk powder mixture, was built up to a height of 3". The mat contained 15% by weight of the wheat starch-skimmed milk powder mixture.

The mat thus prepared was placed in a wire mesh cage having substantially the same interior dimensions as the mat. The mat, in its cage, was then placed in an autoclave and heated for 15 minutes at 15 p.s.i.g. steam pressure in an atmosphere of live steam. The steam pressure was then released and the product removed.

The autoclaved product resembled, in texture, a piece of meat such as pot roast and was capable of being roasted, broiled, fried or boiled and thereupon converted into an entirely edible product having the chewiness characteristic of meat.

Part D

A portion of the product was sliced into slices 3/16" thick, cutting across the grain. The slices were dried in a shelf drier at 120° F. to a solids content of 86%.

The dehydrated slices were re-hydrated by placing them in a boiling beef-flavored gravy and cooking until the slices were completely re-hydrated and tender.

It is to be understood that numerous modifications will readily occur to those skilled in the art upon reading this description. All such modifications are intended to be included within the scope of the invention as defined in the accompanying claims.

We claim:

1. Method of preparing an edible protein product having an appearance and chewiness simulating that of cooked meat, which comprises adjusting an aqueous dispersion of protein to a protein concentration of from about 18% to about 50% and to a pH of from about 6 to about 8 to form a protein gel precursor, extruding a plurality of cylinders of protein gel precursor, treating the extruded cylinders to inhibit their tendency to fuse themselves into a homogeneous mass, and subjecting the treated mass of cylinders to an elevated temperature to form a chewy protein product.

2. Method of preparing an edible protein product having an appearance and chewiness simulating that of cooked meat, which comprises adjusting an aqueous dispersion of protein to a protein concentration of from about 18% to about 50% and to a pH of from about 6 to about 8 to form a protein gel precursor, extruding a plurality of cylinders of protein gel precursor, coating the cylinders with an edible outer additive, layering the coated cylinders, compacting the layered and coated cylinders, and subjecting the compacted mass of cylinders to an elevated temperature to form a chewy protein product.

3. Method of preparing an edible protein product having an appearance and chewiness simulating that of cooked meat, which comprises adjusting an aqueous dispersion of protein to a protein concentration of from about 18% to about 50% and to a pH of from about 6 to about 8 to form a protein gel precursor, extruding a plurality of cylinders of protein gel precursor, coating the cylinders with an edible outer additive, layering the coated cylinders in substantial parallelism, compacting the layered and coated cylinders, and subjecting the compacted mass of cylinders to an elevated temperature to form a chewy protein product.

4. Method of preparing an edible protein product having an appearance and chewiness simulating that of cooked meat, which comprises adjusting an aqueous dispersion of protein to a protein concentration of from about 18% to about 50% and to a pH of from about 6 to about 8 to form a protein gel precursor, extruding a plurality of cylinders of protein gel precursor, steaming the cylinders to partially set up the gel and inhibit their tendency to fuse themselves into a homogeneous mass, cooling and layering the steamed cylinders, coating the cylinders with an edible outer additive, and autoclaving the coated cylinders.

References Cited in the file of this patent

UNITED STATES PATENTS

| Number | Name | Date |
|---|---|---|
| 168,138 | Carrick | Sept. 28, 1875 |
| 855,438 | Ebel | May 28, 1907 |
| 1,939,400 | Lerche | Dec. 12, 1933 |
| 2,149,920 | Kretchmer | Mar. 7, 1939 |
| 2,264,115 | Grainger et al. | Nov. 25, 1941 |
| 2,505,243 | Hewit et al. | Apr. 25, 1950 |
| 2,560,621 | Wrenshall | July 17, 1951 |
| 2,648,297 | Cloud | Aug. 11, 1953 |
| 2,682,466 | Boyer | June 29, 1954 |

FOREIGN PATENTS

| Number | Country | Date |
|---|---|---|
| 699,692 | Great Britain | Nov. 11, 1953 |
| 620,835 | France | Jan. 24, 1927 |